United States Patent
Jeong et al.

(10) Patent No.: US 8,705,644 B2
(45) Date of Patent: Apr. 22, 2014

(54) METHOD FOR GENERATING AND TRANSMITTING A REFERENCE SIGNAL FOR UPLINK DEMODULATION IN A CLUSTERED DFT-SPREAD OFDM TRANSMISSION SCHEME

(75) Inventors: Byung Jang Jeong, Daejeon (KR); Young Jo Ko, Daejeon (KR); Bangwon Seo, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 88 days.

(21) Appl. No.: 13/387,016

(22) PCT Filed: Sep. 17, 2010

(86) PCT No.: PCT/KR2010/006452
§ 371 (c)(1),
(2), (4) Date: Jan. 25, 2012

(87) PCT Pub. No.: WO2011/034392
PCT Pub. Date: Mar. 24, 2011

(65) Prior Publication Data
US 2012/0269285 A1 Oct. 25, 2012

(30) Foreign Application Priority Data
Sep. 18, 2009 (KR) .......................... 10-2009-0088521

(51) Int. Cl.
*H04L 27/28* (2006.01)

(52) U.S. Cl.
USPC ........... 375/260; 375/267; 375/271; 375/295; 375/299; 375/316

(58) Field of Classification Search
USPC ......... 375/260, 267, 271, 199, 300, 316, 320, 375/340, 342, 346, 347, 350; 370/208, 319, 370/329, 336, 349
See application file for complete search history.

(56) References Cited

U.S. PATENT DOCUMENTS 7,911,935 B2 * 3/2011 Akita et al. .................... 370/208
8,400,958 B2 * 3/2013 Ko et al. ........................ 370/319
(Continued)

FOREIGN PATENT DOCUMENTS

| KR | 1020060131094 | 12/2006 |
|---|---|---|
| KR | 1020080097360 | 11/2008 |

(Continued)

OTHER PUBLICATIONS

Park, Ok-Sun et al., "DSP design and implementation for the UE Modem Controller of the 3G Long-Term Evolution," The Fourth International Conference on Wireless and Mobile Communications, pp. 395-398 (2008).

(Continued)

*Primary Examiner* — Hirdepal Singh
(74) *Attorney, Agent, or Firm* — Nelson Mullins Riley & Scarborough LLP

(57) ABSTRACT

Disclosed is a method for generating and transmitting a reference signal in a clustered DFT-spread OFDM transmission scheme. A method for generating and transmitting a DM-RS in a clustered DFT-spread-OFDM scheme comprises: a step of generating DM-RS sequences corresponding to the number of clusters allocated for an uplink transmission; and a step of mapping the generated DM-RS sequences to the relevant DM-RS symbol positions for each cluster. Accordingly, the method for generating and transmitting a reference signal according to the present invention, in which DM-RS sequences are allocated and transmitted on a cluster basis, uses a complete DM-RS sequence for each cluster, and therefore inter-cell interference can be weakened, and problems which might occur when applied to a multi-user MIMO (MU-MIMO) scheme can be solved.

4 Claims, 4 Drawing Sheets

(56) References Cited

U.S. PATENT DOCUMENTS

| | | | |
|---|---|---|---|
| 8,503,425 B2* | 8/2013 | Chung et al. | 370/349 |
| 2007/0183386 A1* | 8/2007 | Muharemovic et al. | 370/344 |
| 2008/0080467 A1* | 4/2008 | Pajukoski et al. | 370/342 |
| 2008/0318608 A1* | 12/2008 | Inoue et al. | 455/509 |
| 2009/0080500 A1 | 3/2009 | Muharemovic et al. | |
| 2009/0201863 A1* | 8/2009 | Pi | 370/329 |
| 2010/0002804 A1* | 1/2010 | Ogawa et al. | 375/300 |
| 2010/0142455 A1* | 6/2010 | Imamura | 370/329 |
| 2010/0173642 A1* | 7/2010 | Iwai et al. | 455/450 |
| 2010/0215031 A1 | 8/2010 | Kim et al. | |
| 2010/0238877 A1* | 9/2010 | Nam et al. | 370/329 |
| 2011/0075760 A1* | 3/2011 | Ogawa et al. | 375/296 |
| 2011/0110357 A1* | 5/2011 | Chung et al. | 370/344 |
| 2012/0057543 A1* | 3/2012 | Yokomura et al. | 370/329 |
| 2012/0093120 A1* | 4/2012 | Ko et al. | 370/329 |
| 2013/0182692 A1* | 7/2013 | Dai et al. | 370/336 |

FOREIGN PATENT DOCUMENTS

| | | | |
|---|---|---|---|
| KR | 1020090075853 | | 7/2009 |
| KR | 1020090093025 | | 9/2009 |
| WO | WO2008/093716 | * | 8/2008 |
| WO | WO2008/155904 | * | 12/2008 |
| WO | WO2009/019878 | * | 2/2009 |
| WO | 2011/034392 A2 | | 3/2011 |

OTHER PUBLICATIONS

Prasad, Narayan et al., "Efficient Receiver Algorithms for DFT-Spread OFDM Systems," IEEE Transactions on Wireless Communications, vol. 8(6):3216-3225 (2009).

International Search Report and Written Opinion for Application No. PCT/KR2010/006452, dated May 24, 2011.

* cited by examiner

METHOD FOR GENERATING AND TRANSMITTING A REFERENCE SIGNAL FOR UPLINK DEMODULATION IN A CLUSTERED DFT-SPREAD OFDM TRANSMISSION SCHEME

RELATED APPLICATIONS

This application is a 35 U.S.C. §371 filing of International Application Number PCT/KR2010/006452 which was filed on Sep. 17, 2010, which claims priority to, and the benefit of, Korean Application No. 10-2009-0088521, filed on Sep. 18, 2009. The contents of the aforementioned application are hereby incorporated herein by reference.

TECHNICAL FIELD

Example embodiments of the present invention relate to a method of generating and transmitting a reference signal, and more particularly, to a method of generating and transmitting an uplink demodulation reference signal in a clustered discrete Fourier transformer (DFT)-spread-orthogonal frequency division multiplexing (OFDM) transmission scheme used as an uplink transmission scheme in the 3rd generation partnership project (3GPP) long-term evolution (LTE).

BACKGROUND ART

Single-carrier (SC)-frequency division multiple access (FDMA), which is similar to OFDM, but is capable of reducing power consumption and power amplifier cost of a portable terminal by decreasing a peak to average power ratio (PAPR) has been adopted in an uplink of LTE standardized as part of a next-generation mobile communication standard in 3GPP.

SC-FDMA is a technique that is very similar to OFDM in which a signal is divided and transmitted in sub-carriers using a fast Fourier transformer (FFT) and an inverse-FFT (IFFT) for transmission. Further, use of a guard interval (cyclic prefix) enables a simple equalizer to be used in a frequency domain with respect to inter-symbol interference (ISI) caused by multi-path fading, as in an existing OFDM technique. However, power efficiency of a transmitter has been enhanced by reducing a PAPR at a transmitter stage by about 2 to 3 dB using an additional unique technique.

A problem associated with an existing OFDM transmitter is that frequency-axis signals loaded on respective sub-carriers are transformed into time-axis signals by the IFFT. Since the IFFT takes a form in which the same operations are in parallel, PAPR increase is caused.

FIG. 1 is a block diagram for explaining an SC-FDMA transmission scheme that is an uplink access scheme adopted in 3GPP LTE.

In order to solve such a problem, in SC-FDMA, a signal is first processed by a discrete Fourier transformer (DFT) 102 before the signal is mapped to a sub-carrier, as shown in FIG. 1. A signal spread (i.e., pre-coded) by the DFT is mapped 103 to the sub-carrier, and then transformed into a time-axis signal by the IFFT 104. In SC-FDMA, a PAPR of the time domain signal from the IFFT 104 is not greatly increased due to correlations between the DFT 102, the sub-carrier mapping 103 and the IFFT 104, unlike OFDM. Accordingly, SC-FDMA is advantageous in transmission power efficiency.

That is, SC-FDMA has robustness for a multi-path channel by having a similar structure to OFDM, and enables efficient use of a power amplifier (PA) by fundamentally resolving a problem of the existing OFDM that an IFFT operation increases the PAPR. Meanwhile, SC-FDMA is also called a DFT-spread-OFDM (DFT-s-OFDM)

Further, standardization of LTE-Advanced, which is an enhanced version of LTE, has been actively conducted by the 3GPP group, and an SC-FDMA technique and an OFDM technique have been competing in the LTE-Advanced standardization process, as in the LTE standardization process. However, a clustered DFT-s-OFDM scheme allowing for discontinuous resource allocation has been adopted.

FIG. 2 is a block diagram for explaining a clustered DFT-s-OFDM transmission scheme adopted as an uplink access scheme in an LTE-Advanced standard.

An important characteristic of the clustered DFT-s-OFDM scheme is that the clustered DFT-s-OFDM scheme can flexibly cope with a frequency selective fading environment by enabling frequency selective resource allocation.

Meanwhile, in the case of an LTE uplink, a demodulation reference signal (DM-RS) used for channel estimation for demodulating a physical uplink control channel (PUCCH) and a physical uplink shared channel (PUSCH) is generated and transmitted using a constant amplitude zero autocorrelation (CAZAC) sequence. In order to identify the DM-RSs between terminals for multi-user MIMO (MU-MIMO), DM-RS orthogonality between the terminals is realized by using, in the DM-RS, the CAZAC sequence having a different cyclic shift value between the terminals.

In this case, since the clustered DFT-s-OFDM scheme adopted as an uplink access scheme of the LTE-Advanced allows discontinuous resource allocation, unlike SC-FDMA that is an uplink access scheme of conventional LTE, transmitted uplink data may be divided into several clusters.

Accordingly, the clustered DFT-s-OFDM scheme adopted as the uplink access scheme of the LTE-advanced requires a method of generating and transmitting a DM-RS in a cluster unit, unlike SC-FDMA that is the uplink access scheme of the conventional LTE.

DISCLOSURE

Technical Problem

Accordingly, example embodiments of the present invention are provided to substantially obviate one or more problems due to limitations and disadvantages of the related art.

Example embodiments of the present invention provide a method of generating and transmitting a reference signal, which is suitable for a clustered DFT-s-OFDM transmission scheme.

Technical Solution

In some example embodiments, a method of generating and transmitting a reference signal, which is suitable for a clustered DFT-s-OFDM transmission scheme, includes allocating one DM-RS sequence to each terminal for uplink transmission; dividing the allocated DM-RS sequence according to sizes of resource blocks (RBs) allocated to respective transmitted clusters; and mapping divided DM-RS sequences to locations of corresponding DM-RS symbols of the respective clusters for transmission.

Here, the allocating of the DM-RS sequence may include allocating a DM-RS sequence having a length corresponding to a sum of numbers of sub-carriers of the RBs allocated to the respective transmitted clusters.

In this case, when the length of the DM-RS sequence is equal to or greater than a length corresponding to three RBs, the DM-RS sequence may be generated from an extended Zadoff-Chu (ZC) sequence, which is a kind of constant amplitude zero autocorrelation (CAZAC) sequence, and when the length of the DM-RS is smaller than the length corresponding to the three RBs, the DM-RS sequence may be generated using a computer-generated (CG)-CAZAC sequence.

Here, the mapping of the divided DM-RS sequences to locations of corresponding DM-RS symbols of the respective clusters for transmission may include: for a slot to which a normal CP in which one slot consists of seven symbols is applied, the DM-RS may be mapped to the fourth symbol for transmission, and for a slot to which an extended CP in which one slot consists of six symbols is applied, the DM-RS may be mapped to the third symbol for transmission.

In other example embodiments, a method of generating and transmitting a reference signal, which is suitable for a clustered DFT-s-OFDM transmission scheme, includes generating a DM-RS sequence to each cluster allocated for uplink transmission; and mapping the generated DM-RS sequences to locations of corresponding DM-RS symbols of the respective clusters for transmission.

Here, the generating of the DM-RS sequence for each allocated cluster may include: when a length of the DM-RS sequence is equal to or greater than a length corresponding to three RBs, the DM-RS sequence may be generated from an extended ZC sequence, which is a kind of CAZAC sequence, and when the length of the DM-RS is smaller than the length corresponding to the three RBs, the DM-RS sequence may be generated using a CG-CAZAC sequence.

Here, the mapping of the generated DM-RS sequences to the locations of corresponding DM-RS symbols of the respective clusters for transmission may include: for a slot to which a normal CP in which one slot consists of seven symbols is applied, the DM-RS may be mapped to the fourth symbol for transmission, and for a slot to which an extended CP in which one slot consists of six symbols is applied, the DM-RS may be mapped to the third symbol for transmission.

Advantageous Effects

Use of the method of generating and transmitting an RS signal as described above enables DM-RS signal generation and transmission corresponding to flexible frequency resource allocation of the clustered DFT-s-OFDM selected as a uplink access system in 3GPP LTE-advanced.

In particular, in accordance with the method of generating and transmitting a RS signal in which a DM-RS sequence is allocated to each cluster for transmission according to the present invention, a complete DM-RS sequence is used in a cluster unit. Thus, inter-cell interference is reduced and multi-user MIMO (MU-MIMO) is applied with no problem.

MODES OF THE INVENTION

Figure 1:
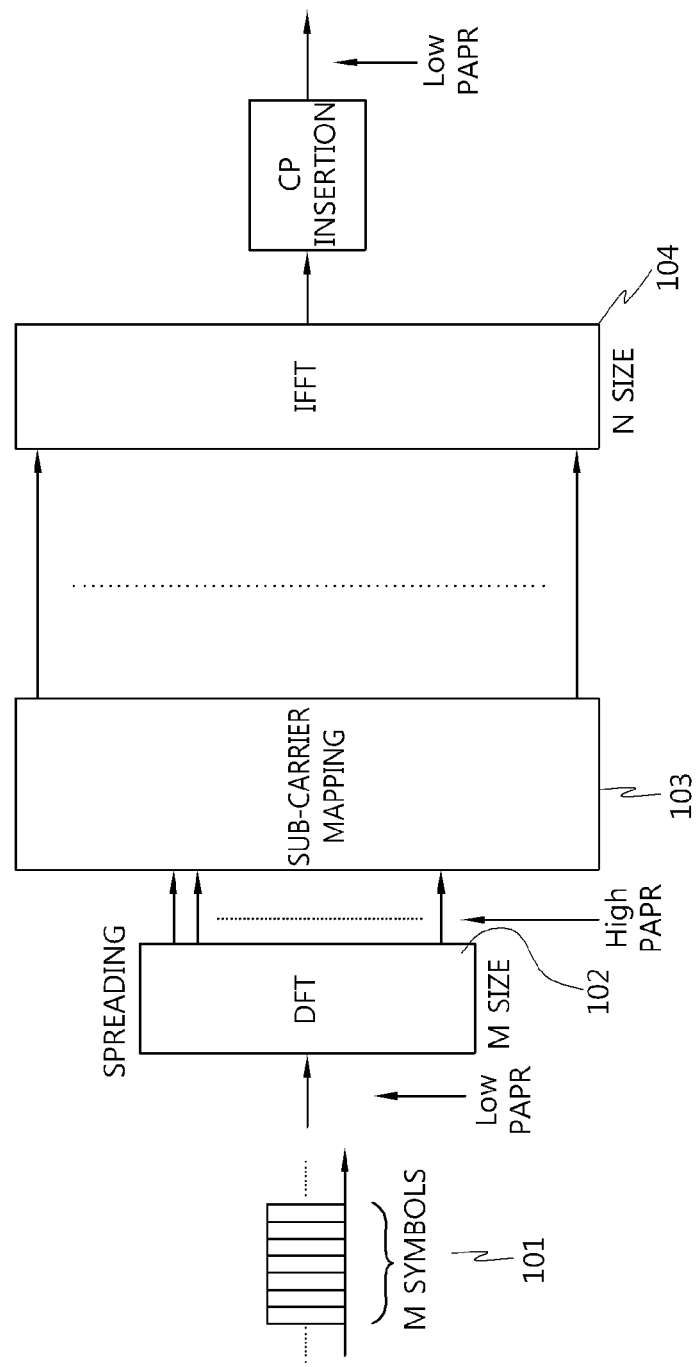
FIG. 1 is a block diagram for explaining an SC-FDMA transmission scheme that is an uplink access scheme adopted in 3GPP LTE.
Figure 2:
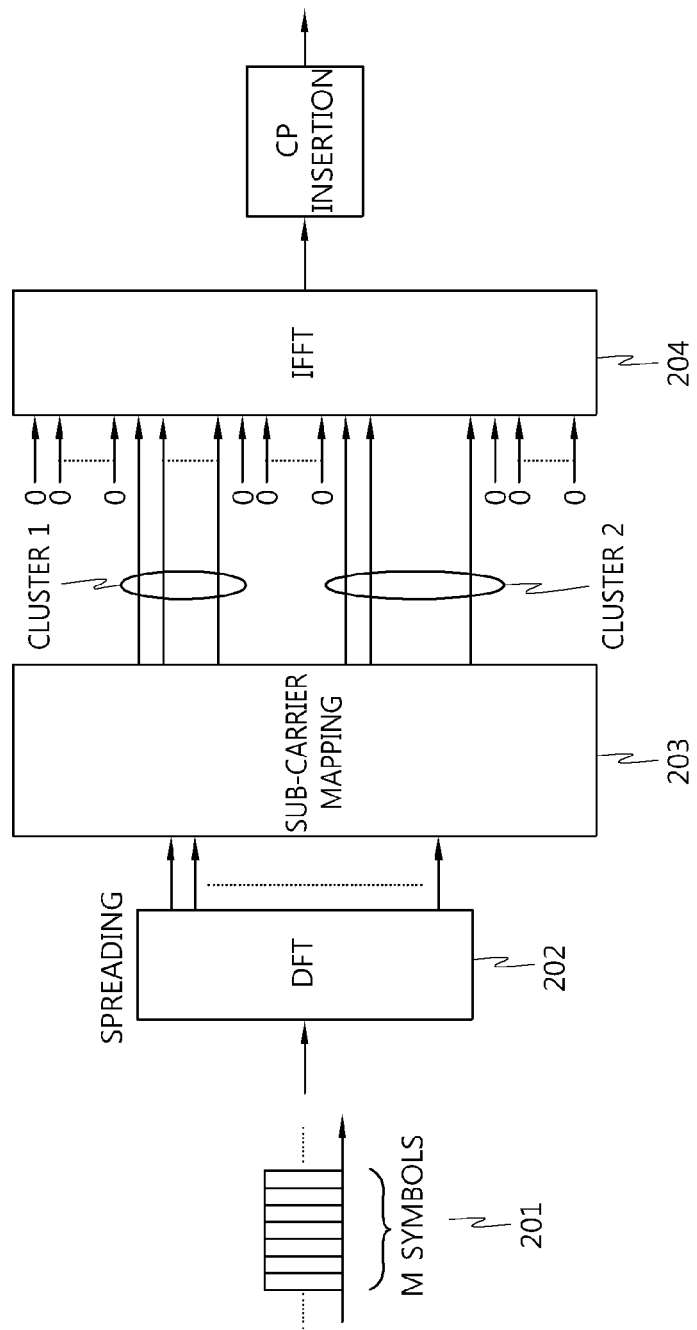
FIG. 2 is a block diagram for explaining a clustered DFT-s-OFDM transmission scheme adopted as an uplink access scheme in an LTE-Advanced standard.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A "terminal" used herein refers to a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or the like. The terminal may include, for example, a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storage and player home appliance having a wireless communication function, and an Internet home appliance capable of wireless Internet accessing and browsing, as well as a portable unit or terminal having a combination of such functions, but is not limited thereto.

A "base station" used herein generally refers to a stationary point communicating with a terminal, and may be called a base station, node-B, eNode-B, a base transceiver system (BTS), an access point, or the like.

The present invention will now be described in greater detail hereinafter with reference to the accompanying drawings.

In the present invention, two embodiments of a method of generating and transmitting a DM-RS suitable for a clustered DFT-s-OFDM scheme that is an uplink access scheme of LTE-Advanced will be described in detail.

A first example embodiment provides a method by which one DM-RS sequence is generated for each terminal, divided according to length of clusters divided using a clustered DFT-s-OFDM scheme, and mapped to locations of corresponding DM-RS symbols in the respective clusters for transmission.

A second example embodiment provides a method by which several DM-RS sequences can be allocated to one terminal, in which DM-RS sequences corresponding in number to clusters of one terminal are allocated and mapped to DM-RS symbol locations in the respective clusters for transmission.

Hereinafter, the two embodiments will be described in detail.

First Example Embodiment

Figure 3:
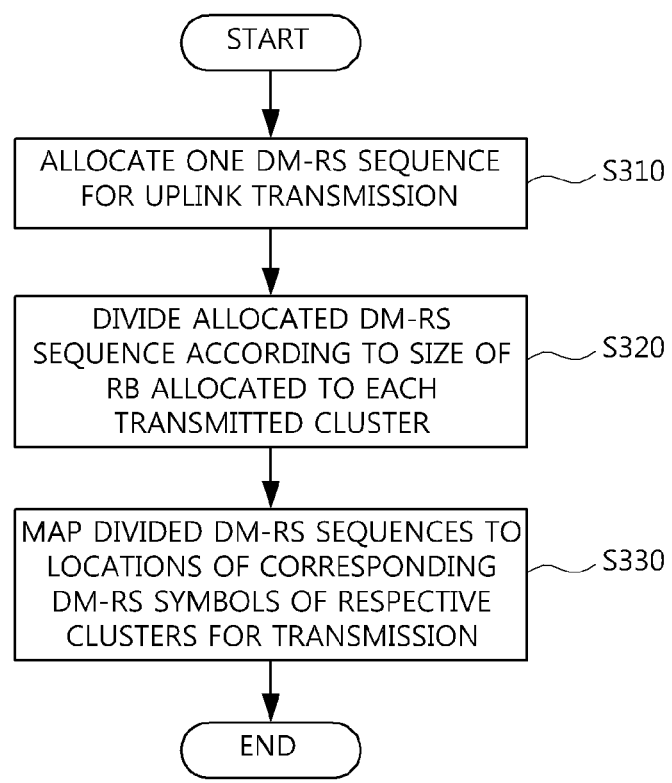
FIG. 3 is a flowchart of a method of generating and transmitting an RS signal according to a first example embodiment of the present invention.

FIG. 3 is a flowchart of a method of generating and transmitting an uplink DM-RS signal according to a first example embodiment of the present invention.

Referring to FIG. 3, a method of generating and transmitting an RS signal according to the first example embodiment of the present invention may include an operation of allocating one DM-RS sequence for uplink transmission (S310); an operation of dividing the DM-RS sequence allocated in operation S310 according to lengths of respective transmitted clusters (S320); and an operation of mapping the divided DM-RS sequences to locations of corresponding DM-RS symbols of the respective clusters for transmission (S330).

In this case, the operation of allocating one DM-RS sequence for uplink transmission (S310) may conform to an uplink DM-RS sequence allocation method in conventional LTE. That is, the DM-RS sequence of the LTE is generated from a CAZAC sequence, and has a length equal to the number of sub-carriers corresponding to the number of resource blocks (RBs) allocated a DM-RS (one RB corresponds to 12 sub-carriers on a frequency).

Accordingly, in the first example embodiment, a DM-RS sequence having a length corresponding to a sum of the numbers of sub-carriers allocated to respective clusters may be allocated. For example, it is assumed that uplink transmission consists of three clusters: cluster 1, cluster 2, and cluster 3. When each of cluster 1 and cluster 2 consists of three RBs and cluster 3 consists of four RBs, the length of the generated DM-RS sequence corresponds to 120 sub-carriers, which correspond to the ten RBs (if one RB consists of 12 sub-carriers).

If a total length of the DM-RS to be generated in operation S310 is equal to or greater than a length corresponding to three RBs, the DM-RS sequence may be generated from an extended Zadoff-Chu (ZC) sequence, which is a kind of CAZAC sequence, and if the total length of the DM-RS is smaller than the length corresponding to the three RBs, the DM-RS sequence may be generated using a computer-generated (CG)-CAZAC sequence.

For reference, the CAZAC sequence used for DM-RS generation includes 30 base sequence groups, each including one or two base sequences according to a possible length of the DM-RS. If the DM-RS length is equal to or less than a length corresponding to five RBs, each group includes one base sequence according to the DM-RS length, and if the DM-RS length is greater than the length corresponding to the five RBs, each group includes two base sequences according to the DM-RS length. A base sequence used by terminals in one cell to generate the DM-RS is the base sequence in one of such base sequence groups.

Next, the operation of dividing the DM-RS sequence allocated in operation S310 according to lengths of the respective transmitted clusters (S320) includes dividing the DM-RS sequence generated in operation S310 by a length corresponding to the number of sub-carriers allocated to each cluster.

For example, when ten RBs are divided into three clusters and discontinuously transmitted, one DM-RS sequence is generated to have a length corresponding to ten RBs in operation S310.

In this case, the DM-RS sequence having a length corresponding to ten RBs, which is generated to correspond to an uplink PUSCH channel consisting of ten RBs, is divided by the number of sub-carriers constituting divided RBs and allocated to three clusters: cluster 1, cluster 2, and cluster 3.

That is, cluster 1 is allocated resources of three RBs, and allocated a portion of the DM-RS sequence having a length corresponding to ten RBs to correspond to the number of sub-carriers of the three RBs. Similarly, cluster 2 is allocated resources of three RBs as well, and allocated another portion of the DM-RS sequence having a length corresponding to ten RBs to correspond to the number of sub-carriers of the three RBs. Cluster 3 is allocated resources of four RBs and allocated a remaining portion of the DM-RS sequence having a length corresponding to ten RBs to correspond to the number of sub-carriers of the four RBs.

Meanwhile, each cluster may be sequentially allocated a portion of the DM-RS sequence having a length corresponding to ten RBs. Alternatively, each cluster may be non-sequentially allocated a portion of the DM-RS sequence having a length corresponding to ten RBs.

Finally, the operation of mapping the DM-RS sequences divided in operation S320 to locations of corresponding DM-RS symbols of the respective clusters for transmission (S330) may include locating the DM-RS in one OFDM (SC-FDMA) symbol per one radio slot (0.5 ms) for transmission.

For example, in the uplink of current LTE, in the case of a normal CP in which one slot consists of seven symbols, the DM-RS is mapped to the fourth symbol for transmission, and in the case of an extended CP in which one slot consists of six symbols, the DM-RS is mapped to the third symbol for transmission.

The present invention may be applied even when a frame structure is changed, when the location of the symbol to which the DM-RS is mapped is changed according to a further purpose, or when a figure of the symbol to which the DM-RS is mapped is changed in a sub-frame or frame unit, (e.g., when the DM-RS is located in two symbols of one slot for transmission).

Second Example Embodiment

Figure 4:
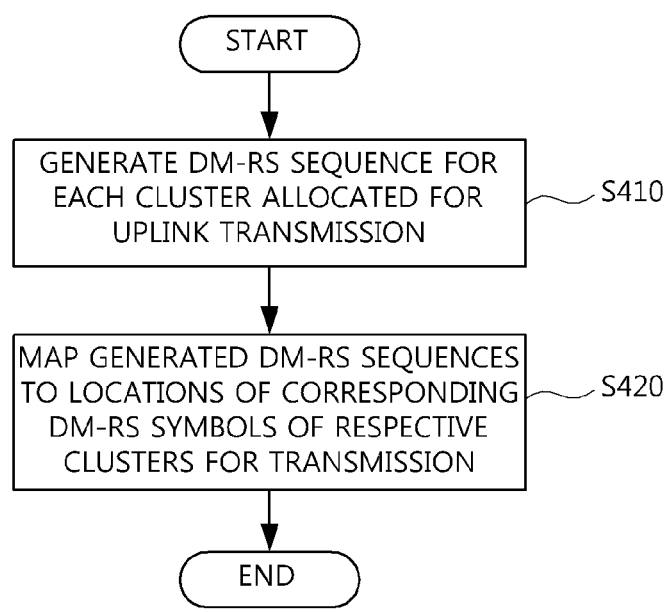
FIG. 4 is a flowchart of a method of generating and transmitting an RS signal according to a second example embodiment of the present invention.

FIG. 4 is a flowchart of a method of generating and transmitting an uplink DM-RS signal according to a second example embodiment of the present invention.

Referring to FIG. 4, a method of generating and transmitting a DM-RS signal according to the second example embodiment of the present invention may include an operation of generating a DM-RS sequence for each cluster allocated for uplink transmission (S410); and an operation of mapping the DM-RS sequences generated in operation S410 to locations of corresponding DM-RS symbols of the respective clusters for transmission (S420).

First, the operation of generating DMRS sequences by the number of clusters allocated for uplink transmission (S410) includes independently allocating the DM-RS sequence to each allocated cluster.

In this case, when the DM-RS sequence is independently allocated to each cluster, clusters having the same size may have the same DM-RS base sequence, but cyclic shift (CS) values of the DM-RSs allocated to the clusters may differ. Alternatively, the CS values may be the same.

For example, since the DM-RSs located in cluster 1 and cluster 2 are located at different frequencies in one terminal, the DM-RS located in cluster 1 is orthogonal to the DM-RS located in cluster 2, even though the clusters have the same base sequence and the same CS.

On the other hand, when clusters located at the same frequency are allocated resources in several terminals, the clusters may have a different CS to maintain DM-RS orthogonality between the terminals.

In this case, clusters not having the same size may have different DM-RS base sequences. For example, if, in one terminal, cluster 1 and cluster 2 are allocated resources with the same size of three RBs and cluster 3 is allocated resources with a size of four RBs, cluster 1 and cluster 2 may have the same base sequences and cluster 3 may have base sequences different from cluster 1 and cluster 2.

Further, clusters having the same base sequences may have different CS values according to whether a cluster of another terminal is allocated to the same frequency resources. When the cluster of the other terminal is not allocated to the same frequency resources, the clusters may have the same CS value.

Finally, the operation of mapping the DM-RS sequences generated in operation S410 to locations of corresponding DM-RS symbols of the respective clusters for transmission (S420) includes mapping the generated DM-RS sequences to locations of corresponding DM-RS symbols of the respective clusters for transmission, similar to operation S330 in the first example embodiment described above.

While the example embodiments of the present invention and their advantages have been described in detail, it should be understood that various changes, substitutions and alterations may be made herein without departing from the scope of the invention.

The invention claimed is:

1. A method of generating and transmitting an uplink demodulation reference signal (DM-RS) in clustered discrete Fourier transformer (DFT)-spread-orthogonal frequency division multiplexing (OFDM) transmission, the method comprising:

allocating one DM-RS sequence to each terminal for uplink transmission,
wherein the allocating of the DM-RS sequence comprises allocating a DM-RS sequence having a length corresponding to a sum of numbers of sub-carriers of the RBs allocated to the respective transmitted clusters, and
wherein when the length of the DM-RS sequence is equal to or greater than a length corresponding to three RBs, the DM-RS sequence is generated from an extended Zadoff-Chu (ZC) sequence, which is a kind of constant amplitude zero autocorrelation (CAZAC) sequence, and when the length of the DM-RS is smaller than the length corresponding to the three RBs, the DM-RS sequence is generated using a computer-generated (CG)-CAZAC sequence;

dividing the allocated DM-RS sequence according to sizes of resource blocks (RBs) allocated to respective transmitted clusters; and mapping divided DM-RS sequences to locations of corresponding DM-RS symbols of the respective clusters for transmission.

2. A method of generating and transmitting an uplink demodulation reference signal (DM-RS) in clustered discrete Fourier transformer (DFT)-spread-orthogonal frequency division multiplexing (OFDM) transmission, the method comprising:

allocating one DM-RS sequence to each terminal for uplink transmission;

dividing the allocated DM-RS sequence according to sizes of resource blocks (RBs) allocated to respective transmitted clusters; and mapping divided DM-RS sequences to locations of corresponding DM-RS symbols of the respective clusters for transmission, wherein the mapping of the divided DM-RS sequences to locations of corresponding DM-RS symbols of the respective clusters for transmission comprises: for a slot to which a normal CP in which one slot consists of seven symbols is applied, the DM-RS is mapped to the fourth symbol for transmission, and for a slot to which an extended CP in which one slot consists of six symbols is applied, the DM-RS is mapped to the third symbol for transmission.

3. A method of generating and transmitting an uplink demodulation reference signal (DM-RS) in clustered discrete Fourier transformer (DFT)-spread-orthogonal frequency division multiplexing (OFDM) transmission, the method comprising:

generating a DM-RS sequence to each cluster allocated for uplink transmission;

wherein the generating of the DM-RS sequence for each allocated cluster comprises: when a length of the DM-RS sequence is equal to or greater than a length corresponding to three resource blocks (RBs), the DM-RS sequence is generated from an extended Zadoff-Chu (ZC) sequence, which is a kind of constant amplitude zero autocorrelation (CAZAC) sequence, and when the length of the DM-RS is smaller than the length corresponding to the three RBs, the DM-RS sequence is generated using a computer-generated (CG)-CAZAC sequence; and mapping the generated DM-RS sequences to locations of corresponding DM-RS symbols of the respective clusters for transmission.

4. A method of generating and transmitting an uplink demodulation reference signal (DM-RS) in clustered discrete Fourier transformer (DFT)-spread-orthogonal frequency division multiplexing (OFDM) transmission, the method comprising:

generating a DM-RS sequence to each cluster allocated for uplink transmission; and mapping the generated DM-RS sequences to locations of corresponding DM-RS symbols of the respective clusters for transmission, wherein the mapping of the generated DM-RS sequences to the locations of corresponding DM-RS symbols of the respective clusters for transmission comprises: for a slot to which a normal CP in which one slot consists of seven symbols is applied, the DM-RS is mapped to the fourth symbol for transmission, and for a slot to which an extended CP in which one slot consists of six symbols is applied, the DM-RS is mapped to the third symbol for transmission.

* * * * *